(12) United States Patent
Carle et al.

(10) Patent No.: US 11,607,981 B2
(45) Date of Patent: Mar. 21, 2023

(54) VEHICLE SEAT COMPRISING A SUPPORT ELEMENT

(71) Applicant: Faurecia Sièges d'Automobile, Nanterre (FR)

(72) Inventors: Laurent Carle, Maisse (FR); Anne-Isabelle Mallet-Da Costa, Etrechy (FR)

(73) Assignee: Faurecia Sièges d'Automobile, Nanterre (FR)

( * ) Notice: Subject to any disclaimer, the term of this patent is extended or adjusted under 35 U.S.C. 154(b) by 0 days.

(21) Appl. No.: 17/476,060

(22) Filed: Sep. 15, 2021

(65) Prior Publication Data

US 2022/0080869 A1 Mar. 17, 2022

(30) Foreign Application Priority Data

Sep. 15, 2020 (FR) ................................. FR 20 09330

(51) Int. Cl.
*B60N 2/90* (2018.01)
*B60H 3/00* (2006.01)

(52) U.S. Cl.
CPC ........... *B60N 2/914* (2018.02); *B60H 3/0035* (2013.01); *B60N 2/976* (2018.02)

(58) Field of Classification Search
CPC ........ B60N 2/914; B60N 2/976; B60N 2/665; B60H 3/0035
USPC ..................................................... 297/284.6
See application file for complete search history.

(56) References Cited

U.S. PATENT DOCUMENTS

| 11,021,085 | B2 * | 6/2021 | Fujii ......................... A47C 7/62 |
| 2008/0309128 | A1 * | 12/2008 | Schneider ............ B60N 2/5657 |
| | | | 297/180.1 |
| 2014/0179212 | A1 * | 6/2014 | Space .................. B60N 2/5635 |
| | | | 454/76 |
| 2015/0091340 | A1 | 4/2015 | Hulway |
| 2016/0236599 | A1 | 8/2016 | Nordalm et al. |
| 2018/0194194 | A1 * | 7/2018 | Lyubich ............. B60H 1/00742 |
| 2018/0281642 | A1 | 10/2018 | Kato et al. |
| 2020/0289694 | A1 * | 9/2020 | Keisen .................... A61L 9/122 |

FOREIGN PATENT DOCUMENTS

| DE | 102006016091 A1 | 10/2007 |
| DE | 102013221516 A1 | 4/2015 |

OTHER PUBLICATIONS

French Search Report corresponding to French Application No. FR 2009330, dated Feb. 25, 2021, 2 pages.

* cited by examiner

*Primary Examiner* — Mark R Wendell
(74) *Attorney, Agent, or Firm* — Reising Ethington P.C.

(57) ABSTRACT

A vehicle seat that includes: at least one support element defining a cavity, an air pump, and at least one olfactory diffuser arranged in the cavity and fluidly connected to the air pump, the olfactory diffuser having an outer casing defining an inner volume, the outer casing defining an air inlet and an air outlet, the olfactory diffuser further having at least one olfactory substance carrier arranged in the inner volume defined by the outer casing. The air pump causes the circulation of a flow of air through the inner volume from the air inlet to the air outlet toward the outside of the cavity.

18 Claims, 6 Drawing Sheets

VEHICLE SEAT COMPRISING A SUPPORT ELEMENT

TECHNICAL FIELD

The present invention relates to a vehicle seat comprising at least one support element.

The support element is, for example, a backrest for supporting the back of a passenger sitting on the seat.

BACKGROUND

In order to improve the comfort and well-being of vehicle passengers, it is known to diffuse a perfume in the vehicle interior, in particular by means of a passive diffuser impregnated with perfume and suspended, for example, from the vehicle interior rearview mirror.

However, such a diffuser does not make it possible to control the diffusion of the perfume, in particular to stop it when no passenger is present in the vehicle and thus leads to a reduced life of the diffuser which it is thus necessary to replace regularly. Moreover, the diffusion of the perfume in the passenger compartment is quickly diluted by the ambient air and the passengers far from the diffuser only sense an attenuated or even non-existent perfume.

SUMMARY

One of the aims of the invention is to overcome these disadvantages by proposing a vehicle seat allowing improved olfactory diffusion for the vehicle's passengers.

To this end, the invention relates to a vehicle seat comprising at least one support element defining a cavity, an air pump, and at least one olfactory diffuser arranged in the cavity and connected fluidly to the air pump, the olfactory diffuser comprising an outer casing defining an inner volume, the outer casing defining an air inlet and an air outlet, the olfactory diffuser further comprising at least one olfactory substance support arranged in the inner volume defined by the outer casing, the air pump causing the circulation of a flow of air through the inner volume from the air inlet to the air outlet, towards the outside of the cavity.

Thus, the seat makes it possible to diffuse the olfactory substance close to the nose of the passenger positioned in the seat and thus enable a better scent of the perfume by the passenger. Moreover, the diffusion by means of the air pump makes it possible to control this olfactory substance diffusion depending on the presence or not of the passenger or depending on passenger preferences, in terms of perfumes. The invention thus makes it possible to improve the comfort of the passenger and increase of duration of use of the diffusion system.

According to other advantageous aspects of the invention, the vehicle seat comprises one or more of the following features, taken alone or in any technically possible combination:

the support element extends along an elevational direction between a lower edge and an upper edge, the olfactory diffuser arranged in the vicinity of the upper edge of the support element;

the support element is a backrest;

the seat further comprises a seat bottom, the backrest comprising a top portion and a bottom portion along an elevation direction, the top portion extending over 25% of the length of the backrest along the elevation direction opposite the seat bottom, from an upper edge of the backrest, the olfactory diffuser being arranged in the top portion of the backrest;

the outer casing of the olfactory diffuser comprises a container defining an access to the inner volume and a cover arranged removably on the access, the air outlet being arranged in the cover;

the cover comprises a reversible closure system for the air outlet;

the olfactory diffuser comprises two walls arranged one on top of the other, the first wall defining the air outlet and the second wall defining at least one opening, the two walls being movable in relation to each other, in particular by rotation, between a closed position, in which the air outlet is closed by the second wall, and an open position, in which the air outlet extends opposite the opening(s);

the olfactory diffuser comprises at least two olfactory substance carriers, in particular three olfactory substance carriers, arranged in the inner volume;

the olfactory diffuser comprises a tray arranged in the inner volume and supporting the olfactory substance carriers, the tray being movable, in particular by rotation, in the inner volume in order to place one of the olfactory substance carriers opposite the air inlet and the air outlet;

the olfactory diffuser extends in a main direction, the air inlet and the air outlet respectively being arranged at the two ends of the olfactory diffuser in the main direction, the tray being displaceable by a rotational movement about the main direction;

the seat further comprises at least one airbag, the or each airbag being fluidly connected to the air pump;

the seat further comprises a valve unit fluidly connected to the air pump, the olfactory diffuser and the at least one airbag, the valve unit being adapted to selectively direct the air flow driven by the air pump towards the olfactory diffuser and/or the at least one airbag.

The invention also relates to an olfactory diffusion method for vehicle interiors comprising the following steps:

providing a seat with an olfactory diffuser;

providing a fluid pump, in particular an air pump, said pump being fluidly connected to at least one inflatable element so as to compress and or decompress the inflatable element, the inflatable element being an inflatable bag located in the seat intended for massaging the occupant, for example;

providing a means for selectively directing the fluid driven by the pump towards an olfactory diffuser and/or the at least one inflatable element.

According to other advantageous aspects of the invention, the method comprises one or more of the following features, taken alone or in any technically possible combination:

the means for selectively directing the fluid is controlled according to a predetermined sequence so as to diffuse an olfactory substance through the olfactory diffuser in relation to the compression/decompression of the inflatable element;

the means for selectively directing the fluid is a valve unit.

The invention also relates to a vehicle comprising a vehicle seat as described above.

BRIEF DESCRIPTION OF THE DRAWINGS

Further aspects and advantages of the invention will become apparent from the following description, given by way of example and made with reference to the attached drawings, in which.

DETAILED DESCRIPTION

Figure 1:
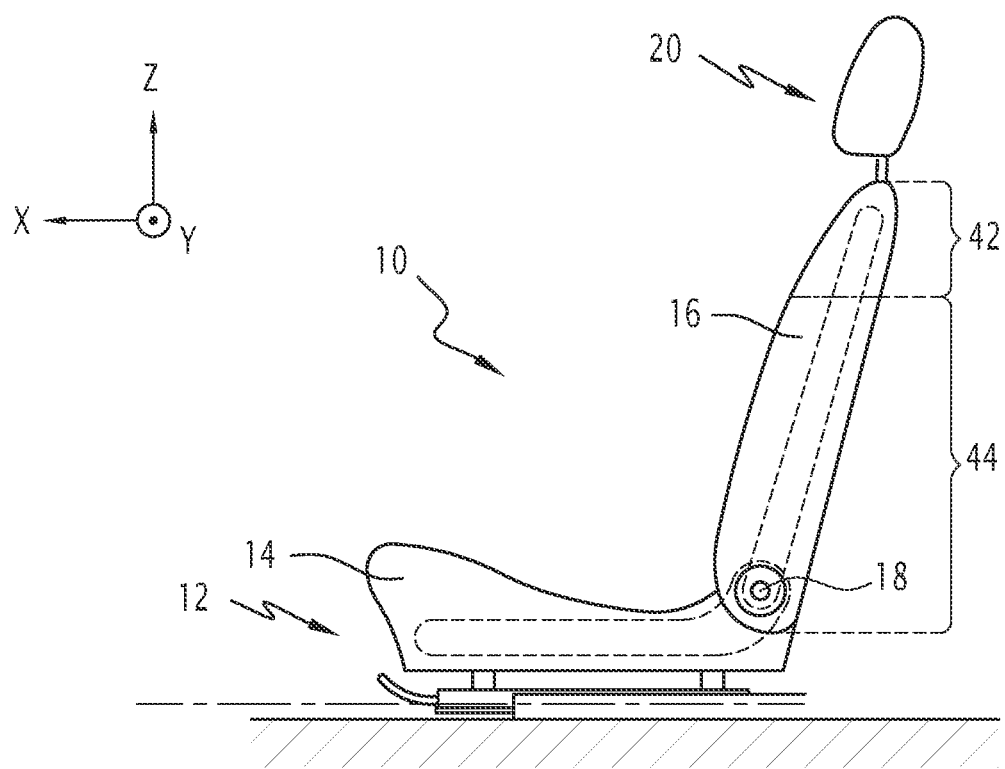
FIG. 1 is a schematic side view of a vehicle seat according to an embodiment of the invention.

A seat 10 according to the invention is shown schematically in FIG. 1.

The seat 10 is suitable for being arranged in the passenger compartment of a motor vehicle and to receive an occupant.

In a variant, the seat 10 is arranged in an air, rail or sea vehicle.

The seat 10 defines a longitudinal direction X-X' identical to the longitudinal direction of the vehicle in which the seat 10 is mounted when the seat is turned towards the front of the vehicle. This longitudinal direction X corresponds to the normal direction of travel of the vehicle and to the length of the vehicle.

The seat 10 also defines a transverse direction Y-Y' corresponding to a direction perpendicular to the normal direction of travel of the vehicle and to the width of the vehicle when the seat is turned toward the front of the vehicle.

The seat 10 also defines an elevation direction Z-Z', perpendicular to the longitudinal X-X' and transverse Y-Y' directions and corresponding to the height of the vehicle.

The seat 10 is mounted on a slide mechanism 12 for adjusting the position of the seat along the longitudinal direction X-X', for example.

As seen in FIG. 1, the seat 10 comprises a seat bottom 14 on which a backrest 16 is mounted, generally pivoting about an axis 18.

The seat 10 also comprises a headrest 20.

The headrest 20 is intended to be removably mounted to the backrest 16 so that the head of the occupant of the seat 10 can rest on the headrest 20 when the occupant is seated on the seat bottom 14 and his/her back is pressed against the backrest 16.

In particular, the headrest 20 is attached to two rods sliding in two corresponding sleeves provided in the backrest 16, the headrest 20 being adjustable in height along the elevation direction Z-Z' by the rods sliding in the sleeves.

Figure 2:
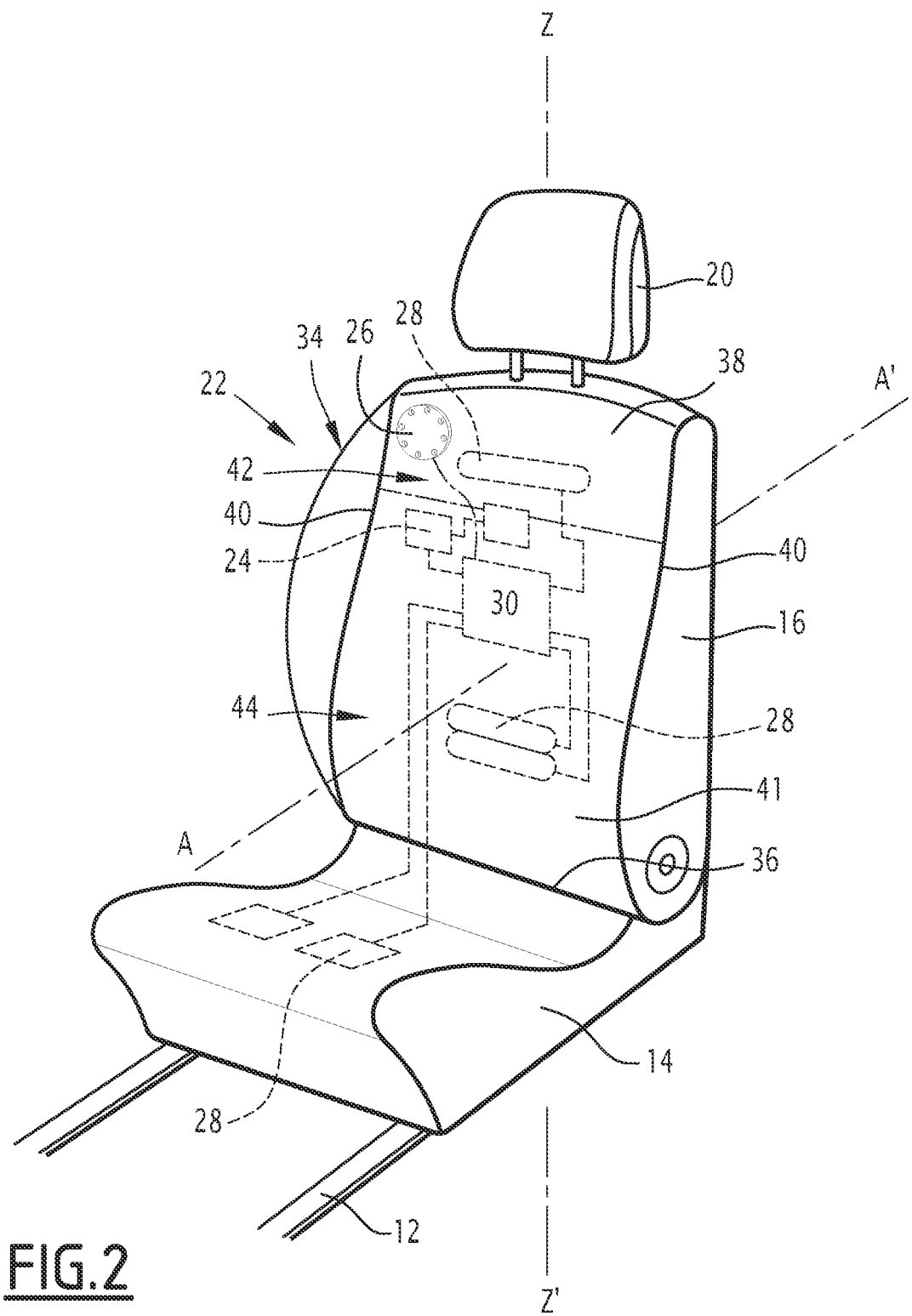
FIG. 2 is a schematic perspective view of the vehicle seat of FIG. 1 including an olfactory diffuser.
Figure 3:
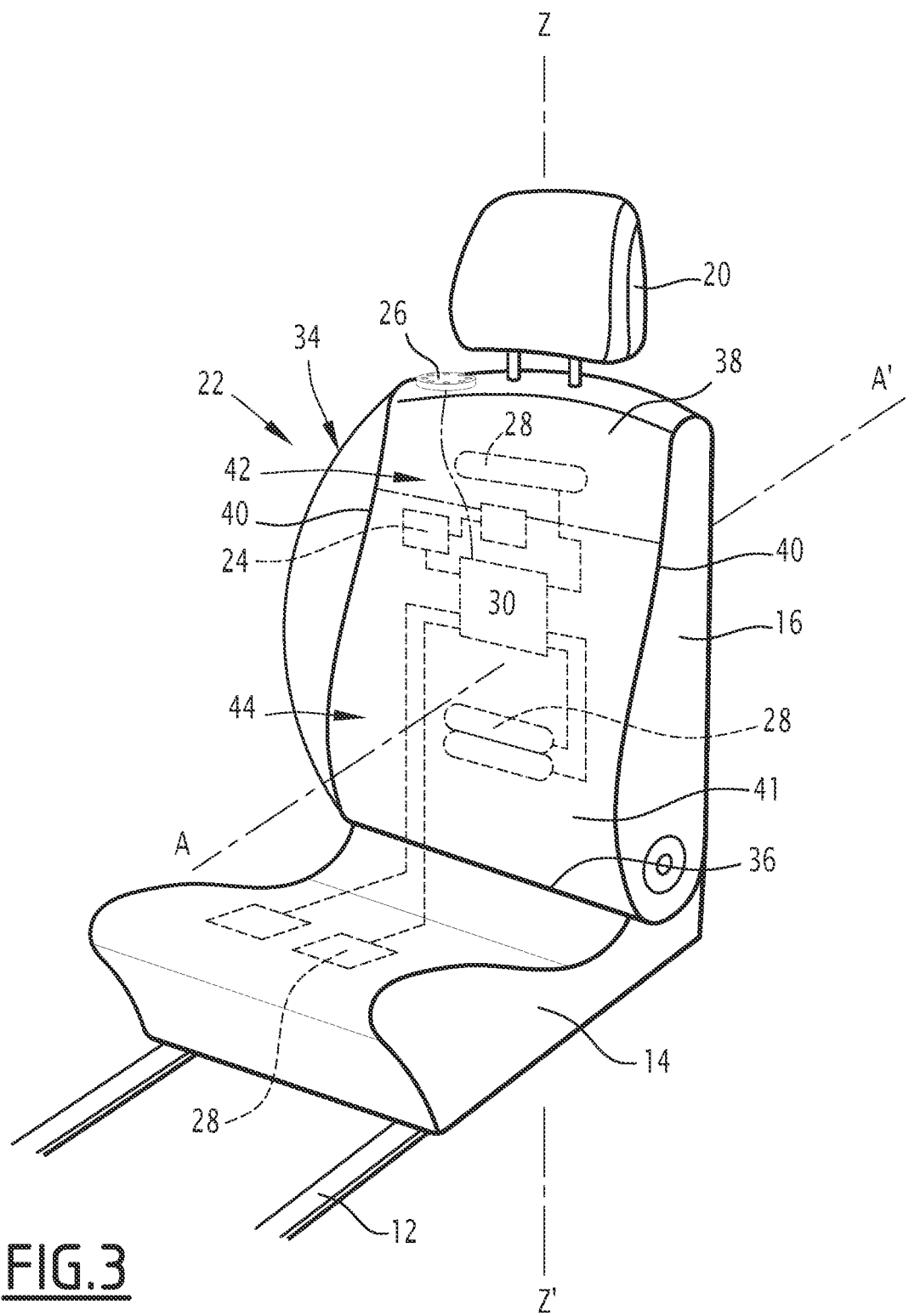
FIG. 3 is a schematic perspective representation of the vehicle seat of FIG. 1 including an olfactory diffuser according to another embodiment.

As seen in FIGS. 2 and 3, the seat 10 comprises at least one support element 22, a fluid pump, in particular an air pump 24, and at least one olfactory diffuser 26 fluidly connected to the air pump 24.

The seat 10 further comprises at least one airbag 28 and a valve unit 30.

The support element 22 is the backrest 16, the headrest 20 or the seat bottom 14, in particular. By way of example, the figures represent the embodiment in which the support element is the backrest 16. It is understood that, in a variant, the support element 22 is the headrest 20 or the seat bottom 14 or else, for example, that the seat comprises several support elements 22, one of which is formed by the backrest 18 and one of which is formed by the headrest 20, each support element comprising at least one olfactory diffuser 26 as described later. Thus, in a variant, the seat comprises a plurality of support elements 22, each comprises one or more diffusers 26.

The support element 22 comprises a bearing surface 32 intended for receiving part of the occupant and advantageously at least one side edge 34. For example, when the support element 22 is a backrest 16, the bearing surface 32 is intended to receive the back of the occupant.

The bearing surface 32 defines a primary orientation A-A', substantially perpendicular to the bearing surface 32, from the bearing surface 32 outwardly of the support element 22.

Thus, the term "toward the front" means a direction corresponding to the direction of travel of the vehicle, for example when the seat 10 is oriented toward the front of the vehicle.

Perpendicular to the bearing surface 32 means perpendicular to a planar portion of the bearing surface 32 against which a portion of the occupant is applied. If the bearing surface 32 is fully curved, the main orientation is perpendicular to the plane tangent to the bearing surface 32 at the deepest area of curvature of the bearing surface 32.

The principal orientation A-A' extends along the direction in which the seat 10 is oriented, such as a direction substantially parallel to the longitudinal direction X-X' of the seat 10 for a seat 10 oriented toward the front.

Each bearing surface 32 comprises edges defining the periphery of the bearing surface 32. In particular, the bearing surface 32 includes a lower edge 36 and an upper edge 38, spaced apart from each other along the elevation direction Z-Z', and connected to each other by side edges 40 extending along the elevation direction Z-Z' on either side of the bearing surface 32.

Each side edge 34 extends along a side edge 40 of the bearing surface 32.

The side edge(s) 34 along with the bearing surface 32 define a space for receiving a portion of the occupant, particularly the back of the occupant, when the support element 22 is the backrest 16.

As seen in FIG. 2, the side edge 34 extends forward along the main orientation A-A' in relation to the bearing surface 32.

The side edge 34 extends from the support surface 22 to a front edge along the main orientation A-A'.

The support element 22 defines a cavity, not referenced.

In particular, the support element 22 comprises a lining element forming the walls of the support element 22 and defining the cavity. The lining element is made of fabric or leather, for example, and extends over a body formed by a foam bottom, for example, of the lining element.

The walls comprise at least one front wall 42, facing the receiving space 34 of the occupant, and a rear wall, opposite the front wall 42 and facing away from the seat 10.

The cavity extends into the body, and thus into the interior volume of the support element 22, that is, into the thickness thereof, between the front wall 41 and the rear wall.

The cavity opens into a diffusion surface of the support element 22 formed by at least a portion of the front wall 41.

The olfactory diffuser 26 is arranged within the cavity and opens into the cavity diffusion surface.

In the embodiment shown in FIG. 2, the olfactory diffuser 26 is arranged at the bearing surface 32.

In particular, the olfactory diffuser 26 is laterally offset along the transverse direction Y-Y' in relation to the center of the bearing surface 32.

As visible in FIG. 2, the olfactory diffuser 26 is arranged in the vicinity of the upper edge of the support element 22.

In particular, the backrest 16 comprises a top portion 42 and a bottom portion 44 along the elevation direction Z-Z'. In particular, the top portion 42 extends over 25% of the length of the backrest 16 along the elevation direction Z-Z' opposite the seat bottom 14, from the upper edge 38.

The olfactory diffuser 26 is arranged in the top part 42 of the backrest 16.

Thus, the olfactory diffuser 26 is arranged so as to diffuse close to the occupant's nose, to enhance the occupant's experience of the olfactory substance without the occupant's back obstructing the diffusion surface.

As visible in FIG. 2, the olfactory diffuser 26 is oriented substantially along the main orientation A-A'.

In a variant, as visible in FIG. 3, the olfactory diffuser 26 is oriented substantially along the Z-Z' elevation direction.

In an alternative embodiment not shown, the olfactory diffuser 26 is arranged at the side edge 34. Thus, the diffusion surface is more offset and the occupant is less likely to obstruct the proper diffusion of the olfactory substance.

In the example shown in the figures, the seat 10 includes a single olfactory diffuser 26.

In a variant or additionally, the support element 22 defines a plurality of cavities and a plurality of diffusion systems 26 arranged within the cavities. For example, the diffusion systems 26 are arranged along the side edges 24.

Figure 4:
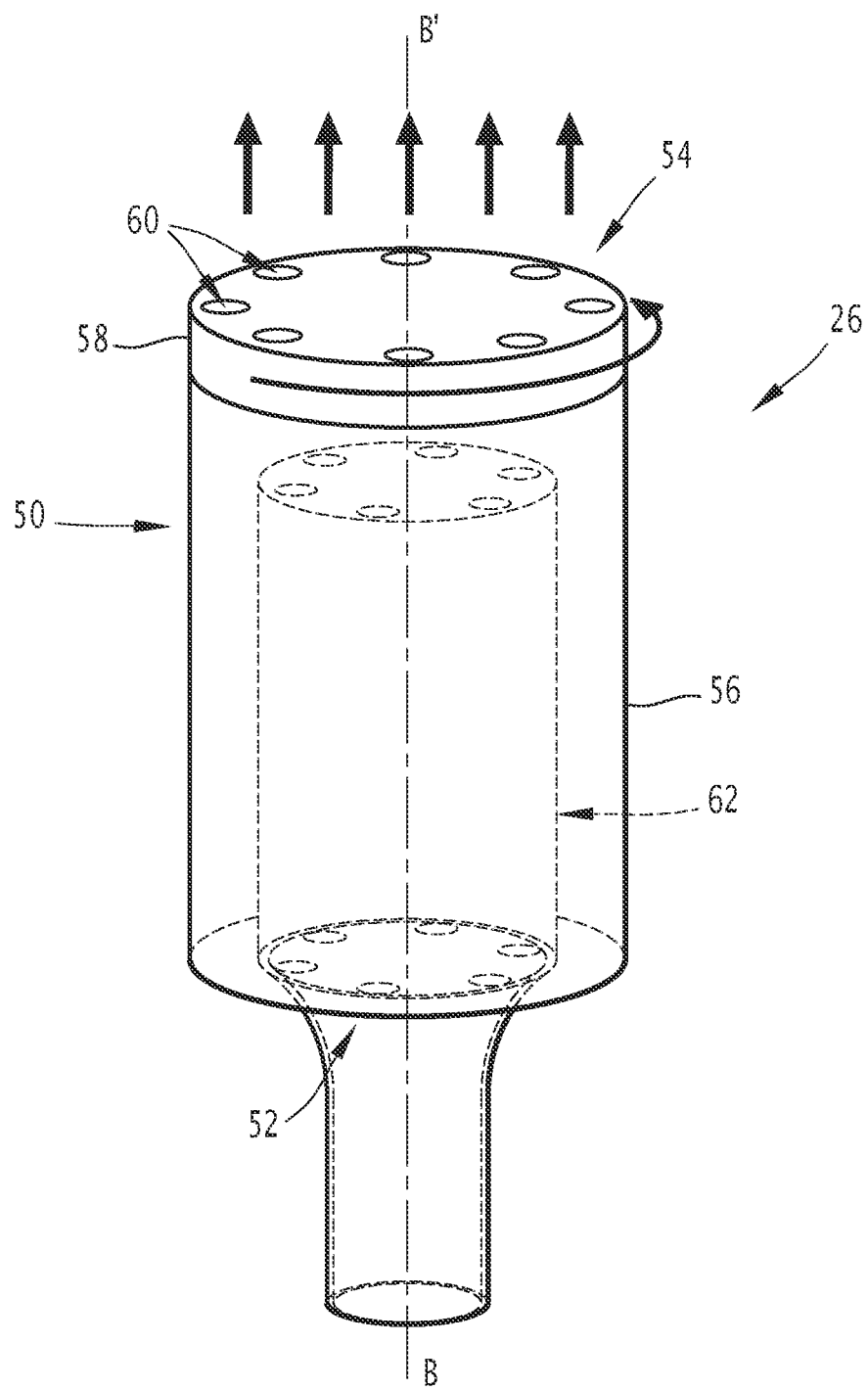
FIG. 4 is a schematic perspective representation of the olfactory diffuser of FIG. 2 according to a first embodiment in an open position.

As visible in FIG. 4, the olfactory diffuser 26 comprises an outer casing 50 defining an inner volume.

In particular, the outer casing 50 is made of a plastic material.

The outer casing 50 extends along a main direction B-B'.

The outer casing 50 defines an air inlet 52 and an air outlet 54. The air inlet 52 and the air outlet 54 are each arranged at an opposite end of the outer casing 50 along the main direction B-B'.

The air inlet 52 and the air outlet 54 place the interior and exterior of the inner volume of the outer casing 50 in fluid communication.

The air outlet 54 is positioned opposite the diffusion surface of the cavity.

The air inlet 52 is fluidly connected to the air pump 24.

The outer casing 50 comprises a container 56 defining access to the inner volume and a cover 58 removably arranged over the access.

The container 56 has a cylindrical shape, for example, extending along the main direction B-B'.

In a variant, the container 56 has a parallelepiped shape, for example.

The air outlet 54 is defined in the cover 58.

The outer casing 50 suitable for moving from a closed configuration, in which the cover 58 interacts with the container 56, to an open configuration, in which the cover 58 is spaced apart from the container 56. The outer casing 50 is reversibly movable from one configuration to the other, in particular by rotation of the cover 58 in relation to the container 56. In particular, a helical thread is formed on the end of the container 56 at the air outlet 54 interacting with a complementary groove formed in the cover 58.

The cover 58 further comprises a reversible closure system for the air outlet 54.

In particular, the cover 58 comprises two walls arranged one on top of the other. The first wall defines the air outlet 54 and the second wall defines at least one opening 60. The two walls are movable in relation to each other between a closed position, shown in FIG. 5, in which the air outlet 54 is closed by the second wall and an open position, shown in FIG. 4, in which the air outlet 54 extends opposite the at least one opening 60.

In particular, the second wall is movable in relation to the first wall by rotation about the main direction B-B'.

In a variant, the first wall is defined at the end of the outer casing 50 and the second wall is defined in the cover 58.

The olfactory diffuser 26 further comprises at least one olfactory substance carrier 62 arranged within the inner volume defined by the outer casing 50.

Each olfactory substance carrier 62 has a cylindrical shape, for example, extending along the main direction B-B'.

Each olfactory substance carrier 62 comprises an olfactory substance such as a perfume intended as relaxing for the occupant, comprising lavender or yuzu essences, for example and/or energizing for the occupant, comprising mint essences, for example.

Each olfactory substance carrier 62 suitable for having an air flow of pass through it, the air flow impregnating the olfactory substance 62.

In particular, each olfactory substance carrier 62 is in a solid and porous form, to allow the air flow to pass through.

The olfactory diffuser 26 thus makes it possible to avoid the use of liquid perfume projected in the form of droplets that present have more complicated maintenance than a solid olfactory substance carrier 62.

Each olfactory substance carrier 62 is suitable for being removed from the inner volume and being replaced with a replacement olfactory substance carrier 62, particularly when the olfactory substance carrier 62 is exhausted or when the occupant desires to change the olfactory substance to be diffused in the passenger compartment.

Figure 5:
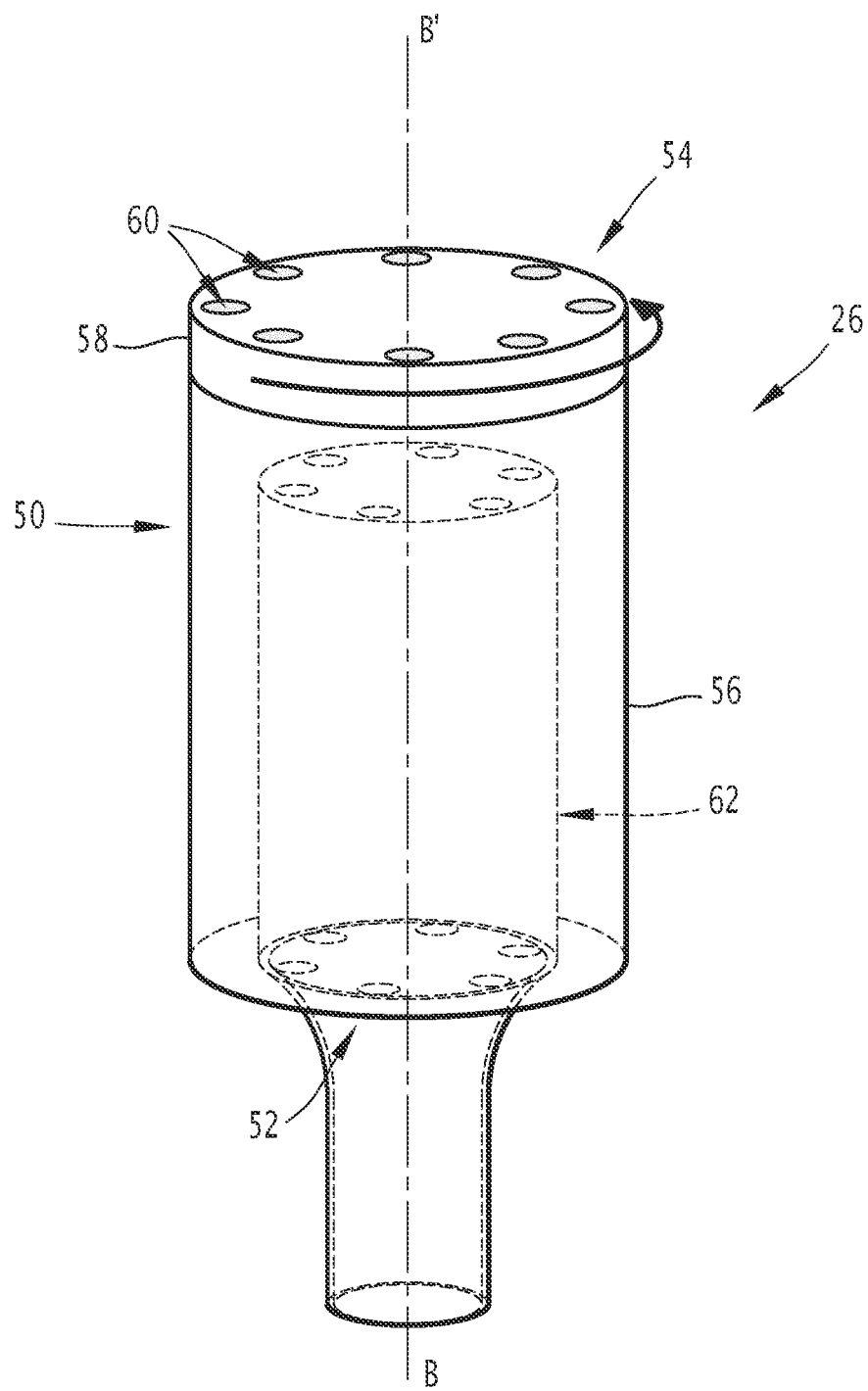
FIG. 5 is a schematic perspective representation of the olfactory diffuser of FIG. 2 according to a first embodiment in a closed position.

A first embodiment of the diffusion system 26 is shown in FIGS. 4 and 5.

Here, the second wall defines a plurality of circular openings 60 arranged regularly around the entire perimeter of the cover 58.

The olfactory diffuser 26 here comprises a single olfactory substance carrier 62. The olfactory substance carrier 62 is arranged between the air inlet 52 and the air outlet 54, along the main direction B-B'.

Figure 6:
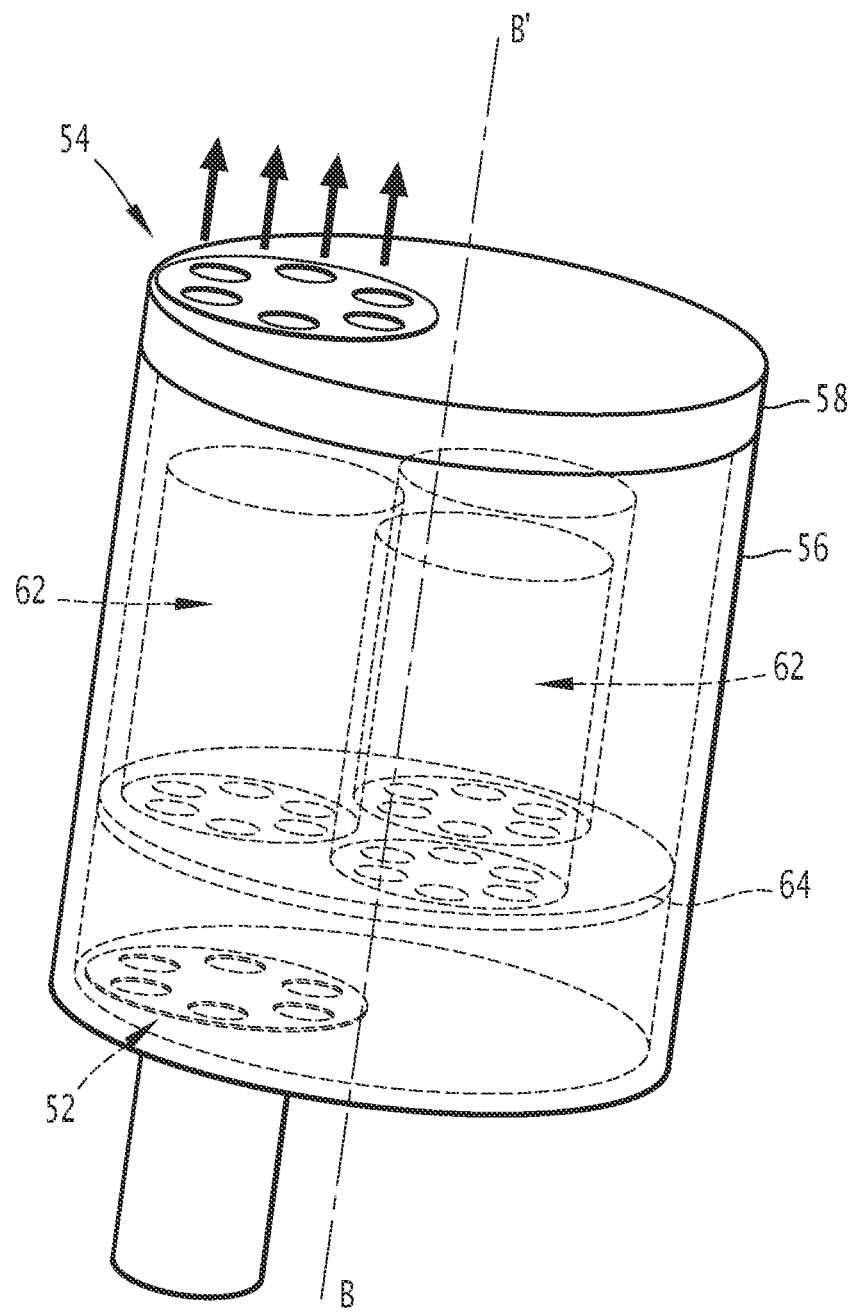
FIG. 6 is a schematic perspective representation of the olfactory diffuser of FIG. 2 according to a second embodiment.

A second embodiment of the diffusion system 26 is shown in FIG. 6.

Here, the second wall defines a plurality of circular openings 60 arranged away from the center of the cover 58, on only one side of the cover 58.

The olfactory diffuser 26 here comprises at least two olfactory substance carriers 62, in particular three olfactory substance carriers 62, arranged in the inner volume.

Each of the olfactory substance carriers 62 advantageously comprises a different olfactory substance. Thus, the olfactory diffuser 26 is suitable for diffusing different olfactory substances, depending on the preferences of the occupant of the seat 10.

In a variant, the olfactory substance carriers 62 all comprise the same olfactory substance and thus constitute spare carriers in case one of the carriers runs out and thus allow for an increased life span of the diffusion system 26 before a replacement of the olfactory substance carriers 62 is necessary.

The olfactory diffuser 26 comprises a tray 64 arranged within the inner volume and supporting the olfactory substance carriers 62.

In particular, the olfactory substance carriers 62 are removably attached to the tray 64, in particular by clipping.

The tray 64 is movable in the inner volume in order to place one of the olfactory substance holders 62 opposite the air inlet 52 and the air outlet 54, in particular opposite the openings 60. In particular, the tray 64 is movable in a rotational motion about the main direction B-B'.

As seen in FIG. 2, the air pump 24 is fluidly connected to the diffusion system 26 and causes the circulation of a flow of air through the inner volume from the air inlet 52 to the air outlet 54, towards the outside of the cavity, when actuated.

The air pump 24 is controlled by the occupant of the seat 10, for example, particularly by means of an electronic control unit included in the valve unit 30. In a variant, or additionally, the air pump 24 is actuated based on particular vehicle operating conditions and/or at regular intervals when the vehicle is occupied.

Each airbag 28 is also fluidly connected to the air pump 24.

As visible in FIG. 2, the airbags 28 are distributed here throughout the seat bottom 14 and backrest 16 of the seat 10. Each inflatable bottom 28 is arranged between the trim of the seat bottom 14 or backrest 16 and the cover covering the trim of the seat bottom 14 trim and/or backrest 16.

Each airbag 28 is an inflatable bag located in the seat, for example, to provide massage to the occupant.

The airbags 28 form a system for massaging the seat occupant by successive inflation/deflation of these airbags 28.

The valve unit 30 is fluidly connected to the air pump 24, the scent diffuser 26 and the at least one airbag 28.

The valve unit 30 is also referred to as a valve block.

The valve unit 30 is adapted to selectively direct the air flow driven by the air pump 24 towards the olfactory diffuser 26 and/or the at least one airbag 28. It is thus possible to control the diffusion of the olfactory substance or the inflation of each of the airbags 28 independently, by controlling the valve unit 30.

In particular, the electronic control unit is suitable for controlling the activation of the air pump 24 and the opening/closing of the various valves of the valve unit 30. The electronic control unit is advantageously connected to at least one sensor present in the vehicle. In particular, the electronic control unit is suitable for receiving information relating to the unlocking of the vehicle doors, the actual opening of at least one door, the ignition of the vehicle engine, and/or the speed of the motor vehicle. For example, the electronic control unit is suitable for controlling the activation of the air pump 24 only when the vehicle is in operation.

An olfactory diffusion method for vehicle interiors will now be described.

Initially, a seat 10 with an olfactory diffuser 26 as described above is provided.

Then, a fluid pump, particularly an air pump 24, is provided. The pump 24 is fluidly connected to at least one inflatable element 28 so as to compress and or decompress the inflatable element 28.

Then, a means is provided, capable of selectively directing the fluid driven by the pump 24 toward an olfactory diffuser 26 and/or the at least one inflatable element 28.

The means for selectively directing the fluid is controlled in a predetermined sequence so as to diffuse an olfactory substance through the olfactory diffuser 26 in relation to the compression/decompression of the inflatable element 28.

The means capable of selectively directing the fluid may be a valve unit 30. It is then conceivable that the present invention has a number of advantages.

Indeed, the diffusion system 26 allows the olfactory substance to be diffused close to the nose of the occupant of the seat 10 by being arranged laterally and in the upper part 42 of the seat 10.

The air pump 24 makes it possible to control the diffusion of the olfactory substance by means of the electronic control unit, in particular based on the presence or not of the occupant and based on his/her preferences.

The seat 10 thus makes it possible to improve the sense of the olfactory substance diffused in the vehicle interior and thus to improve the comfort of the occupant, while increasing the life of the diffusion system 26.

The diffusion system 26 also allows for easy replacement of the olfactory substance carrier(s) 62 in case of exhaustion or desire for a change of scent by the occupant.

Finally, the seat 10 allows a single air pump 24 to be used both to diffuse through the olfactory diffuser 26 and to inflate the airbags 28 which allows for a simpler and less expensive architecture as well as a smaller footprint in the seat 10.

The invention claimed is:

1. A vehicle seat comprising:
   at least one support element defining a cavity,
   an air pump, and
   at least one olfactory diffuser arranged in the cavity and fluidly connected to the air pump, the olfactory diffuser comprising an outer casing defining an inner volume, the outer casing defining an air inlet and an air outlet, the olfactory diffuser further comprising at least one olfactory substance carrier arranged in the inner volume defined by the outer casing,
   the air pump causing the circulation of a flow of air through the inner volume from the air inlet to the air outlet toward the exterior of the cavity,
   wherein the outer casing of the olfactory diffuser comprises a container defining an access to the inner volume and a cover removably arranged over the access, the air outlet being defined in the cover.

2. The seat according to claim 1, wherein the support element extends along an elevational direction between a lower edge and an upper edge, the olfactory diffuser being arranged adjacent the upper edge of the support element.

3. The seat according to claim 1, wherein the support element is a backrest.

4. The seat according to claim 3, wherein the seat further comprises a seat bottom, the backrest comprising a top portion and a bottom portion along an elevation direction, the top portion extending over 25% of the length of the backrest along the elevation direction away from the seat bottom, from an upper edge of the backrest,
   the olfactory diffuser being arranged in the upper portion of the backrest.

5. The seat according to claim 1, wherein the cover comprises a reversible closure system of the air outlet.

6. The seat according to claim 5, wherein the olfactory diffuser comprises two walls arranged one on top of the other, the first wall defining the air outlet and the second wall defining at least one opening, the two walls being movable in relation to each other between a closed position, in which the air outlet is closed by the second wall, and an open position, in which the air outlet extends opposite the opening(s).

7. The seat according to claim 1, wherein the olfactory diffuser comprises at least two olfactory substance carriers arranged in the inner volume.

8. The seat according to claim 7, wherein the olfactory diffuser comprises exactly three olfactory substance carriers arranged in the inner volume.

9. The seat according to claim 7, wherein the olfactory diffuser comprises a tray arranged in the inner volume and supporting the olfactory substance carriers, the tray being movable, in particular by rotation, in the inner volume in order to place one of the olfactory substance carriers opposite the air inlet and the air outlet.

10. The seat according to claim 9, wherein the olfactory diffuser extends along a main direction, the air inlet and the air outlet being arranged respectively at both ends of the olfactory diffuser along the main direction, the tray being movable in a rotational motion about the main direction.

11. The seat according to claim 1, further comprising at least one airbag, the or each airbag being fluidly connected to the air pump.

12. The seat according to claim 11, further comprising a valve unit fluidly connected to the air pump, the olfactory diffuser, and the at least one airbag, the valve unit being suitable for selectively directing the flow of air driven by the air pump toward the olfactory diffuser and/or the at least one airbag.

13. An olfactory diffusion method for a vehicle interior comprising the following steps:
providing a seat with an olfactory diffuser;
providing a fluid pump, said pump being fluidly connected to at least one inflatable element so as to compress and or decompress the inflatable element, the inflatable element being an inflatable bag located in the seat; providing a means for selectively directing the fluid driven by the pump towards an olfactory diffuser and/or the at least one inflatable element.

14. The diffusion method according to claim 13, wherein the means for selectively directing the fluid is controlled in a predetermined sequence so as to diffuse an olfactory substance through the olfactory diffuser in relation to the compression decompression of the inflatable element.

15. The diffusion method according to claim 13, wherein the means adapted to selectively direct the fluid is a valve unit.

16. The diffusion method according to claim 13, wherein the inflatable bag is located in the seat to provide a massage to the occupant.

17. The diffusion method according to claim 13, wherein the fluid pump is an air pump.

18. A vehicle seat comprising:
at least one support element defining a cavity,
an air pump,
at least one airbag, the or each airbag being fluidly connected to the air pump, and
at least one olfactory diffuser arranged in the cavity and fluidly connected to the air pump, the olfactory diffuser comprising an outer casing defining an inner volume, the outer casing defining an air inlet and an air outlet, the olfactory diffuser further comprising at least one olfactory substance carrier arranged in the inner volume defined by the outer casing,
the air pump causing the circulation of a flow of air through the inner volume from the air inlet to the air outlet toward the exterior of the cavity.

\* \* \* \* \*